United States Patent
Chen et al.

(10) Patent No.: US 8,117,155 B2
(45) Date of Patent: Feb. 14, 2012

(54) COLLECTION-BASED OBJECT REPLICATION

(75) Inventors: Wei Chen, Beijing (CN); Dan Teodosiu, Kirkland, WA (US); Cristian George Teodorescu, Seattle, WA (US); Xuezheng Liu, Beijing (CN); Zheng Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1200 days.

(21) Appl. No.: 11/428,214

(22) Filed: Jun. 30, 2006

(65) Prior Publication Data
US 2008/0005199 A1 Jan. 3, 2008

(51) Int. Cl.
*G07F 7/00* (2006.01)
(52) U.S. Cl. ........................................................ 707/637
(58) Field of Classification Search ................... 707/637
See application file for complete search history.

(56) References Cited

U.S. PATENT DOCUMENTS

| | | | | |
|---|---|---|---|---|
| 5,519,855 A | * | 5/1996 | Neeman et al. | 707/3 |
| 5,588,147 A | * | 12/1996 | Neeman et al. | 707/1 |
| 5,799,306 A | * | 8/1998 | Sun et al. | 707/102 |
| 5,909,540 A | * | 6/1999 | Carter et al. | 714/4 |
| 7,024,580 B2 | * | 4/2006 | Guimbellot et al. | 714/1 |
| 7,185,076 B1 | * | 2/2007 | Novaes et al. | 709/223 |
| 7,206,836 B2 | * | 4/2007 | Dinker et al. | 709/224 |
| 7,346,734 B2 | * | 3/2008 | Chen et al. | 711/114 |
| 7,478,263 B1 | * | 1/2009 | Kownacki et al. | 714/4 |

* cited by examiner

*Primary Examiner* — Charles Rones
*Assistant Examiner* — Mellissa M Chojnacki
(74) *Attorney, Agent, or Firm* — Lee & Hayes, PLLC

(57) ABSTRACT

Collection-based object replication for a system that includes a client computing device (client) connected to a server and multiple data storage nodes. In certain cases, a data storage node generates a replica of multiple replicas of a collection. The collection is a unit of data placement, access, replication, and repair. Other data storage nodes are also configured with a respective replica of the multiple replicas. The data storage node verifies whether an object received directly from the client for storage in the collection has been fully replicated by the other data storage nodes in respective replicas.

20 Claims, 5 Drawing Sheets

COLLECTION-BASED OBJECT REPLICATION

BACKGROUND

A storage replication service is a managed service in which stored or archived data is duplicated among a number of data storage nodes. This provides a measure of redundancy that can be invaluable if a data storage node fails. To obtain storage replication services, including data object storage and replication, data access, and data removal services, a client computing device typically requests a central server to directly perform the service(s). One reason for this is because the server generally maintains a central data structure to index locations of each stored data object in the system to respective storage devices. As data objects are stored and replicated in the system, the server indexes the storage locations of the corresponding replicas so that they can be subsequently located, managed, removed, and repaired responsive to storage node failures. For example, responsive to losing copies of data objects on a failed storage node, the server refers to the index to verify that the lost data objects are fully replicated in the system. However, a centralized index represents a scalability and performance bottleneck in systems containing a very large number of data objects.

SUMMARY

Collection-based object replication is described in a system that includes a client computing device (client) connected to a server and to multiple data storage nodes. In one aspect, a data storage node contains a replica out of multiple replicas of a collection. The collection is a unit of data placement, access, replication, and repair. Other data storage nodes are also configured with a respective replica of the multiple replicas. The data storage node verifies whether an object received directly from the client for storage in the collection has been fully replicated by the other data storage nodes in respective replicas.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

DETAILED DESCRIPTION

Overview

Collection-based object replication is described in reference to the systems and methods of FIGS. 1-5. The systems and methods for collection-based object replication address the scalability and performance bottleneck limitations common in conventional systems that use a centralized index to index a very large number of data objects. This is accomplished, at least in part, by implementing decentralized management of data object replicas on the data storage nodes themselves. To this end, the systems and methods group objects together by application to form collections of objects. A collection is a unit of data placement, replication, and data repair. The systems and methods allow applications to create collections, store objects into collections, retrieve objects, delete objects, and delete collections.

To provide system reliability, the systems and methods replicate individual objects within a collection by storing multiple replicas of the collection across different data storage nodes. Object replication operations include data storage node-based determinations of whether objects are fully replicated across all collection locations. Additionally, responsive to data storage node-based determinations that a data object may not have been successfully replicated on a different target data storage node, a data storage node will attempt to ensure that the data object is successfully replicated on the different data storage node—and thus fully replicated in the system. Additionally, when an object is to be deleted from the system, data storage nodes work together to ensure that all copies of the object are removed from corresponding collection replicas, regardless of whether data storage nodes and/or communications fail during object removal operations.

These and other aspects of collection-based object replication are now described.

An Exemplary System

Although not required, collection-based object replication is described in the general context of computer-executable instructions (program modules) being executed by computing devices such as a general-purpose computer or a mobile handheld device. Program modules generally include routines, programs, objects, components, data structures, etc., that perform particular tasks or implement particular abstract data types. While collection-based object replication is described in the foregoing context, acts and operations described hereinafter may also be implemented in hardware.

Figure 1:
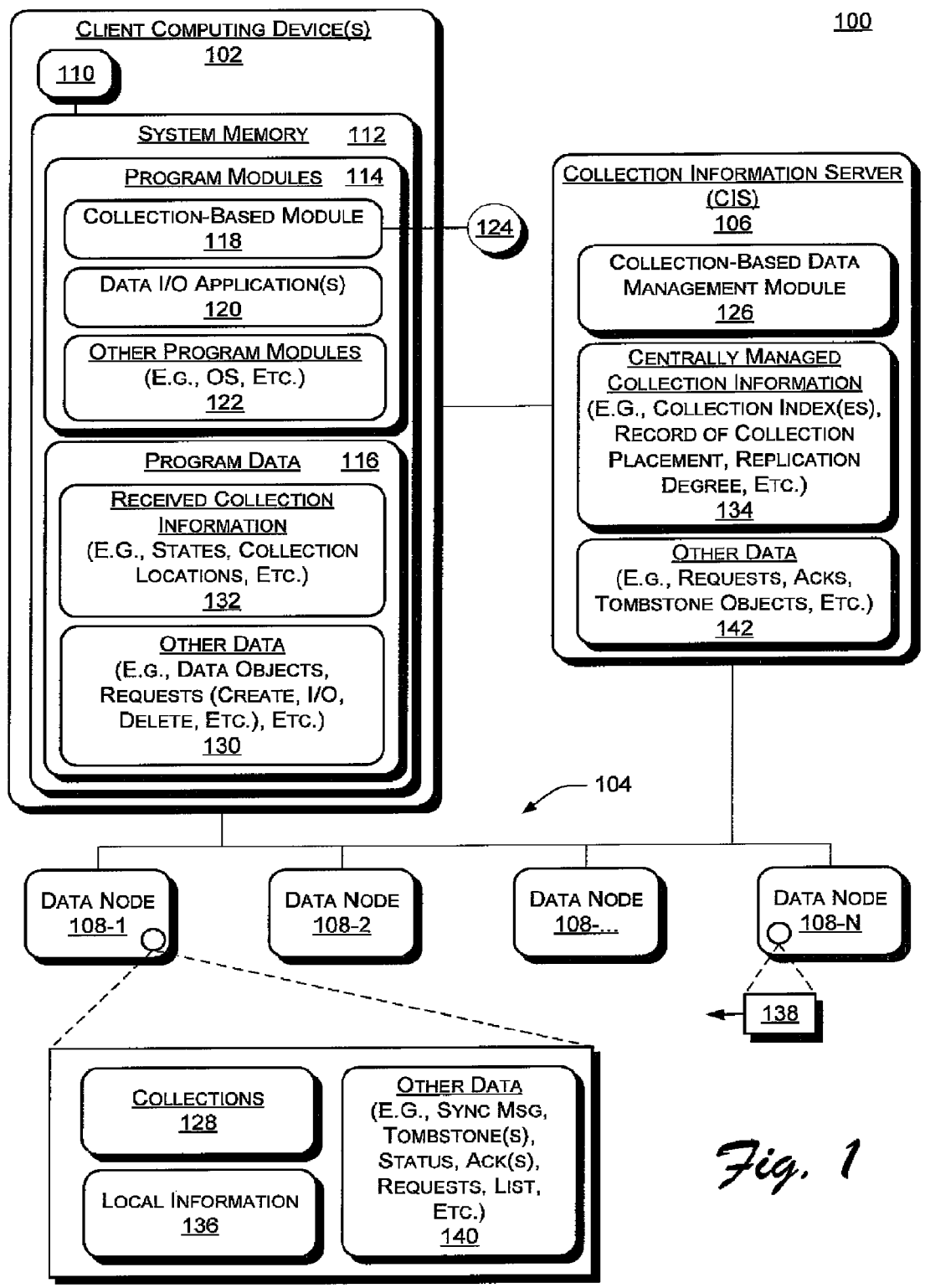
FIG. 1 shows an exemplary system for collection-based replication in a storage area network, according to one embodiment.

FIG. 1 shows an exemplary system 100 for collection-based replication in a storage area network, according to one embodiment. System 100 groups multiple data objects together by application to form respective collections of objects. A collection is a unit of data placement, access, replication, and repair. To these ends, system 100 includes client computing device(s) 102 coupled across network 104 to collection information server (CIS) 106, and data storage nodes ("data nodes" and/or "nodes") 108-1 through 108-N. Network 104 may include any combination of a local area network (LAN) and a general wide area network (WAN) communication environments, such as those which are commonplace in offices, enterprise-wide computer networks, intranets, and the Internet.

Each of client computing device(s) 102, CIS 106, and data nodes 108 includes a respective processor coupled to a system memory. The respective processor is configured to fetch and execute computer-program instructions stored in the system memory to perform respective aspects of collection-based object replication associated with the particular component.

For example, client computing device ("client") 102 includes processor 110 coupled to system memory 112. System memory 112 includes program modules 114 and program data 116. In this implementation, program modules 114 include, for example, collection-based module 118, one or more data I/O applications 120, and other program modules 122 such as an operating system (OS), etc.

Collection-based module 118 provides data I/O application(s) 120 with collection-based object replication facilities for collection-based data object storage, replication, retrieval, removal, and repair facilities. To provide these facilities to data I/O application(s) 120, collection-based module 118 exposes application program interface (API) 124. An application 120 invokes respective interfaces of API 124 to request CIS 106, and more particularly collection-based data management module 126, to create collections 128 for subsequent data object storage, replication, retrieval, removal, and automated data object repair responsive to data node 108 failure. For purposes of exemplary illustration, such data objects are shown as a respective portion of "other program data" 130.

Once a collection has been created, the application 120 uses API 124 to receive information (i.e., received collection information 132) specific to a particular collection 128 from management module 126. In view of this received information, the application 120 directly communicates with at least a subset of data nodes 108 to store data objects into collections 128, retrieve stored data objects, remove data objects from collections 128, and delete collections 128. Exemplary APIs 124 for an application 120 to create a collection 128, to request and receive collection information 134 specific to a particular collection 128, store data objects into a collection 128, remove data objects from collections 128, and delete collections 128 are respectively described below in the sections titled "Collection Creation", "Data Object Storage/Check-In", "Data Object Checkout and Removal", and "Collection Deletion".

Management module 126 maintains information indicating which data nodes 108 (collection locations) store replicas of collections 128, and other information. This information is shown as centrally managed collection information 134. In this implementation, for each collection 128, centrally managed collection information 134 includes for example:
  a collection identifier (cid).
  k, replication degree, the desired number of replicas for this collection.
  t, the minimum number of successfully stored object replicas when a check-in operation is successful.
  $L_c$, a set of current locations for collection replicas (i.e., data node 108 identifiers).
  $L_c'$ a set of future locations; in steady state, $L_c'$ is the same as $L_c$.
  an execution_plan: when $L_c'$ differs from $L_c$, the execution plan includes steps to be taken by management module 126 to move collection locations from $L_c$ to $L_c'$. A step, for example, describes a source data node ("source") 108 and a destination data node ("destination") 108 of data movement during data repair and load balancing operations. For example, $L_c=\{A, B, C\}$ and $L_c'=\{A, B, D\}$, and execution_plan=$\{(move\ C\ to\ D)\}$, which denotes a load balancing operation moving the collection replica in location C to a new location D (A, B, C, and D represent respective ones of data storage nodes 108).
  instance number, a current instance number for the collection 128. Every change to $L_c$ or $L_c'$ causes management module 126 to increment the instance number.
  recycle, the set of locations for collection replicas (data nodes 108) that are out-dated, and should be deleted from the set of current locations.

Using centrally managed collection information 134, management module 126 determines whether the number of replicas of a collection 128 is the same as an indicated replication degree A, migrates collections 128 responsive to permanent failure of data node(s) 108, and performs load balancing operations. These operations are respectively described in greater detail in the following sections titled "Exemplary Collection Repair for Permanent Data Node Failures", "Transient Data Node Failures", and "Load Balancing".

Collection Creation

To create a collection 128 for subsequent storage of data objects, an application 120 calls create collection interface of API 124. In one implementation, a create collection interface of API 124 for example is:
  Status=CreateCollection(cid, k, t), wherein
  cid represents the unique id (e.g., generated by client 102) of a collection 128
  k represents a replication degree of the collection 128. In one implementation, all collections 128 have a same replication degree k. In another implementation, replication degree k may differ from one collection 128 to another collection 128. In one implementation, API 124 includes an interface for a client 102 to change k and/or t over time.
  t represents a minimum replication degree ($1 \leq t \leq k$) used for a successful completion of a data object storage/check-in operation to this collection 128. In one implementation, if a check-in is successful, the data object is guaranteed to be stored on at least t data nodes 108. It is not required that a check-in operation be always successful when there are t data nodes 108 storing replicas of a collection 128.
  Return: success or failure.

In this implementation, for example, CreateCollection(cid, k, t) is executed by collection-based module 118 as follows:
  Collection-based module 118 sends a create collection request (including cid, k, and t) to management module 126;
  Responsive to receiving the create collection request, management module 126 checks centrally managed collection information 134 to determine if cid already exists or is under creation. If so, failure status is returned. If not, management module 126:
    selects k data nodes 108 for the locations of a new collection 128;
    initializes a respective portion of centrally managed collection information 134 for the collection 128. For example, the cid in data structure 134 is the cid passed in; $L_c$ is the set of k data nodes 108 with enough free space; $L_c'=L_c$; execution_plan is empty; instance number=1; and recycle (i.e., delete) is empty. CIS 106 informs the k data nodes about this new collection 128; sending the corresponding collection information.
  The k data nodes 128 store the respective portion of new collection information locally in the local information 136 and send respective acknowledgments back to management module 126. If management module 126 does not receive acknowledgments from all k data nodes, then the instance number is incremented and the immediately previous step and this step is retried for a different set of data nodes 108 until k available nodes are selected.
  Return: success.

Get Collection Locations, Etc.

Before an application 120 stores data objects into a collection 128, removes data objects from the collection 128, and/or deletes the collection 128, the application 120 determines data nodes 108 (collection locations) that maintain replicas of the collection. To this end, the application 120 calls the get collection interface of API 124. In one implementation, the get location interface is implemented, for example, as (Status, k, t, $L_c$, $L_c'$, instance number) GetCollectionLocation(cid), wherein
cid represents the id of the collection 128 of interest;
k is the replication degree of the collection 128;
t is the minimum number of successfully stored object replicas when a check-in operation is successful;
$L_c$ and $L_c'$ represent two sets of data node 108 locations; and
instance number represents the instance number of the collection 128.

$L_c$ is the set of current locations, and $L_c'$ is the set of future locations ($|L_c'|$=k, where k is the replication degree of the collection 128). The two sets differ in the following situations: (1) when some collection location is lost and data is being repaired to a new data node 108; or (2) for load balancing purpose the collection locations are being moved.

Responsive to a get collection location call (e.g., GetCollectionLocation(cid)), collection-based model 118 sends a request to management module 126 to retrieve a list of data nodes 108 that store the collection 128. Responsive to receiving the request, management module 126 checks if the identified collection has been created successfully by the create collection interface portion of API 124. If not, management module 126 returns an error code indicating the collection 128 has not been created successfully. Otherwise, management module 126 extracts the requested information and the instance number from centrally managed collection information 134, and returns the information to collection-based module 118. For purposes of exemplary illustration, the information returned by the get collection interface of API 124 (e.g., Status, k, t, $L_c$, $L_c'$, instance number, and/or so on) is shown on a client 102 as "received collection information" 132.

Using at least a subset of received collection information 132, an application 120 uses API 124 to store data objects into a collection 128, remove data objects from the collection 128, and/or delete the collection 128. In this implementation, if returned $L_c$ specifies no data nodes 108, the identified collection 128 is lost due to permanent failures of corresponding nodes 108. The specified collection 128 is in a normal or stable state if $L_c$=$L_c'$; the collection 128 is in a transitional state otherwise. For example, during client 102 data object input operations to a collection 128, a collection transitional state indicates that the data object has been successfully stored by a data node 108 into the collection 128, and the data object may or may not have been successfully (or yet) stored by other identified data node(s) 108. In this same scenario, a collection 128 in stable state indicates that a data object is successfully stored locally at a data node 108 and the object has also been successfully stored to other designated collection locations. Each data node 108 maintains local information 136 for each collection 128 (including collection state) stored on the data node 108.

Data Object Storage/Check-In

An application 120 uses API 124 to store (check-in) data objects into a collection 128. In one implementation, for example, a check-in interface is:

Status Check-in (object, cid, oid, wherein:
object represents content of the data object to be replicated in a collection 128 across at least a subset of data nodes 108;
oid represents a unique id of the object within a collection (oid, for example, can be assigned by the application 120, etc.);
cid represents a unique id of the collection 128 to which the object belongs; and
Return: success or failure.

Responsive to invocation of Check-in (object, cid, old), collection-based module 118 sends a list of the collection locations and an instance number associated with the collection 128 to the first data node 108 in the collection locations, and streams the object to the first data node 108 identified in the collection location list. In this implementation, it is assumed that the collection list is equivalent to $L_c$ for the collection 128. In another implementation, the collection list is equivalent to $L_c'$ to anticipate new locations.

Responsive to receiving this information, the data node 108 checks if the instance number is the same as what is stored locally for the collection 128. If not, the data node 108 returns an error code to client 102. If the local instance number is lower, the data node 108 initiates a collection refresh operation (please see the section below titled "Collection Refresh") to synchronize local information 136 associated with the collection 128 with centrally managed collection information 134, and obtains the matching instance of the collection 128. When the instance number matches, the first data node 108 stores the object locally. The data node 108 stores at least a subset of the information in a corresponding portion of local information 136.

In this object check-in scenario, and before an object is successfully stored on a data node 108 (e.g., successful in view of a communicated checksum of the object, and/or other criteria), local information 136 associated with the object (i.e., the object's corresponding collection 128) is in a temporary state. Temporary state is logically equivalent to no permanent object record. That is, if data node 108 failure occurs while the object state is still temporary, the object can be deleted by the data node 108 and the space re-collected. If an object is successfully stored on a data node 108, and if the data node 108 is not the last data node 108 in the collection list, the data node 108 sets the local information 136 associated with the object to a partial state, and communicates the following to the next data node 108 in the collection location list: the object, the list, and the instance number. The partial state of the object on a data node means that the object has been successfully stored locally but it is not yet sure if the object replicas have also been stored successfully in other designated collection locations. These check-in operations are repeated by each data node 108 in the ordered collection location list until each data node 108 has successfully stored the object, or incurred failure. Indication of such incurred failure is propagated by the failing data node 108 or its immediately preceding data node 108 in reverse order down the list of collection locations to the first data node 108 in the list, which in-turn, notifies the client 102.

After the last data node 108 in the ordered collection list has successfully stored the object, the last data node 108 sets the local information 136 associated with the object to a complete state. The complete state of the object on a data node means that it is sure that the object has also been replicated to all designated collection locations. The data node only updates the object state to complete when the corresponding collection is in the stable state. If the collection is in the transitional state, the data node keeps the object in the partial state. Then, the last data node 108 sends an acknowledgement 138 in reverse order direction to the immediately preceding data node 108 in the chain. Responsive to receiving such an acknowledgement 138, the data node 108 updates (changes) local information 136 pertaining to the object from partial to complete, again only when the collection is in the stable state. The data node 108 then sends an acknowledgement 138 to any sequentially previous data node 108 in the chain so that the sequentially previous data node 108 may similarly update object status associated with the data object from partial to complete when the collection is in the stable state.

When the collection is in the stable state, this process is repeated in reverse chain direction until each of the data nodes 108 in the chain has updated the locally maintained status of the data object from partial to complete. When the first data node 108 in the list receives such an acknowledgement, the first data node 108 returns a success status to the requesting client 102.

When the collection is in the transitional state, the current collection locations $L_c$ may not have k nodes. If $L_c$ has at least t nodes, where t is the minimum number of successfully stored object replicas specified by the create collection API 124, then when the first data node 108 in the list receives an acknowledgement from the second node in the list, the first data node 108 still returns a success status to the requesting client 102.

Object state on a data node is only changed to complete when the collection state is in the stable state, i.e., $L_c=L_c'$. If the collection state is transitional ($L_c \neq L_c'$), then the object state on a data node is set to partial.

In one implementation, if during object check-in operations a data node 108 determines that a locally maintained status associated with the object has remained partial for a configurable period of time, and that an acknowledgement to change the status to stable has not been received from a data node 108 subsequent in a chain of nodes 108, the data node 100 actively probes (e.g., pings) other data node(s) 108 downstream in the chain to make sure that the other data node(s) 108 have a copy of the data object being stored. If so, the other data node(s) 108 can turn the state associated with the local copy of the object to complete and send a corresponding acknowledgement 138, as indicated above. Otherwise, the data node 108 provides the object to at least the next data node 108 in the chain. An exemplary implementation of these operations is described below in the section titled "Partial Object Repair".

In view of the above, it is clear that although management module 126 creates and maintains a record of data nodes 108 that host respective collections 128, management module 126 does not need to: (a) index individual data objects grouped within a collection 128 to identify which collections store which objects; or (b) maintain indications of whether objects in a collection 128 have been fully replicated to collection locations. The first aspect (a) is determined according to the particular implementation of the application 120 that checks data objects into a collection 128. The second aspect (b) is determined by respective ones of the data nodes 108 that store replicas of the collection 128.

Partial Object Repair

An object replica stored on a data node 108 being in the partial state indicates that the data node 108 storing the collection 128 does not know if the object stored in the collection 128 has also successfully stored at other collection locations. To ensure data reliability, a data node 108 is responsible for turning all objects stored locally with the partial state into the complete state. To this end, the data node 108 executes, for example, the following partial object repair operations that are carried out for a particular object that is in partial state, and this partial object repair operation is initiated only when the data node sees that the collection is in the stable state ($L_c=L_c'$):

1. The data node 108 (i.e., the originator) uses its current collection location information (a respective portion of local information 136) to contact each other data node 108 in $L_c$ to request that the other data node check if it has a corresponding copy of the data object.
2. When a data node 108 receives such a request, the data node checks whether the locally maintained instance number for the collection 128 matches the received instance number. If the locally maintained number is lower than the received number, the data node 108 initiates a collection refresh operation (please see the section below titled "Collection Refresh"). If the locally maintained number is higher than the received number, the data node returns an error code to the originating data node 108 (causing the originating node to initiate a collection refresh operation). If the instance number matches, then the data node 108 checks if a replica of the data object exists locally and returns the finding to the originating data node 108.
3. When the originator receives a status from the other data node 108, if the result is no object on the other data node 108, then the originator streams the object to the other data node. When the receiving data node has completely stored the object locally into a replica of the collection 128, the data object is marked as partial, and a success acknowledgment is communicated to the originator.
4. When the originator learns that all other data nodes 108 in $L_c$ have the object stored, then it turns its local object replica to the complete state. If the originator cannot successfully contact all other data nodes in $L_c$ in a configurable amount of time, it retries steps 1 to 3 periodically until the repair process is successful. During the retry, it is possible that the collection location $L_c$ is changed. In this case, the originator will contact the new set of data nodes in $L_c$.

In one implementation, partial object repair is implemented by a chained protocol analogous to the described data object check-in protocol, but the chain of communication is initiated individually by each data node 108 that has an object in partial state. Also, for all partial objects in one collection 128, the protocol can be batch-executed. The partial object repair operations use local collection information (local information 136) on data nodes 108. If a collection 128 is experiencing changes (e.g., due to collection repair or load balancing operations), partial object repair operations can be aborted to yield to the collection level changes. Partial object repair can be re-initiated after collection level changes are done and the collection is back to the stable state, to ensure correctness of the transitional and stable state semantics of collections 128 that encapsulate objects.

Data Object Checkout and Removal

After an application 120 has retrieved collection information 132 indicating locations of data nodes 108 storing a particular collection 128, the application can use a respective interface of API 124 to check-out (retrieve) data object(s) from the particular collection 128. For example, in one implementation, a data object check-out interface is:
(status, object)=Checkout(cid, oid), wherein
cid represents the id of the collection 128;
oid represents the id of the object in the collection;

status represents the status operation, either successful or failure; and object: the content of the object if a successful status is returned.

Responsive to such a data object check-out call, collection-based module 118 contacts the first data node 108 in the associated ordered collection locations list to retrieve the object. In one implementation, if a data node 108 is not accessible, or the request result is not returned during a configurable period of time, collection-based module 118 will automatically try to obtain the object from a next data node 108 in the list. Responsive to a data node 108 receiving a check-out request, the data node 108 checks local information 136 to determine if the instance number of the collection 128 comprising the object is correct. If the local instance number is lower, the data node 108 refreshes the associated collection 128 (please see the section titled "Collection Refresh"). If instance number matches, the data node 108 checks if object exists in the collection. If not, an error code ("object not found") is returned to the client 102. Otherwise, the data node 108 checks if the object has been deleted (please refer to the "Delete" protocol below). If so, the data node 108 returns an error code (e.g., "object has been deleted"). Otherwise, the data node 108 streams the object to the requester and returns a success code.

After an application 120 has retrieved collection information 132 indicating locations of data nodes 108 storing a particular collection 128, the application can use a respective interface of API 124 to delete data object(s) from the particular collection 128. For example, in one implementation, a data object delete interface is:

status=Delete(cid, oid), wherein cid represents the id of the collection 128;

oid represents the id of the object to be removed; and status: success or failure status.

Responsive to such a data object delete interface invocation, collection-based module 118 contacts a first data node 108 in the associated and ordered collection locations (list) to remove the object. For each object to be deleted from a respective data node 108, the data node 108 creates a tombstone object (shown as a respective portion of "other data" 140 on data node 108-1). The tombstone object identifies the object and includes a same partial or complete state as maintained in local information 136 pertaining to the object. The delete object protocol flow is analogous to the described object check-in object flow, with the exception that the target operation is to: remove the object upon which a last node 108 turns status of the tombstone object to complete, and communicate a removal acknowledgement 138 for migration in reverse chain order of the ordered collection locations. Responsive to a data node receiving the removal acknowledgement, the data node turns the status of the local tombstone object to complete. When a tombstone object is complete on a collection location, the object and its corresponding tombstone object are garbage-collected at that location.

To ensure that all copies of an object marked for deletion are removed, in one implementation a collection location data node 108 waits until the associated tombstone object and the object for deletion are both in complete state. At this point, the data node 108 proceeds with local garbage collection. This may result in data copying to turn the object complete even if the object has already been tombstoned. In another implementation, when the tombstone object turns complete on a data node 108, the data node 108 contacts other collection locations to make sure all tombstone object replicas are complete, and then if the data node 108 has a copy of the object, the data node 108 garbage collects both the tombstone and the object. If the local node only has the tombstone but not the object, then the local node waits for all other collection locations with the object to complete garbage collection. This ensures that after garbage collection, the object cannot resurface, for example, as a result of the described partial object recovery process.

Collection Refresh

A collection 128 is synchronized (refreshed) responsive to a request from a data node 108, or automatically (e.g., at periodic intervals) by management module 126. For example, collection refresh operations could be triggered when a data node 108 determines local information 136 (local collection information) is out of date, recovers from a crash, or is rebooted. In one implementation, management module 126 triggers a collection refresh periodically to guarantee that the collection states on all data nodes eventually converge to a same state.

In one implementation, management module 126 triggers a collection refresh operation whenever it changes the centrally managed collection information 134. To these ends, and for each collection 128 represented in centrally managed collection information 134:

management module 126 checks if a data node 108 still belongs to $L_c$ or $L_c'$. If not, the data node 108 is outdated and is marked for garbage collection. If the data node 108 is not out-dated, but a locally maintained collection 128 instance number is lower than it should be, then management module 126 sends the current state of the collection 134 to all data nodes in $L_c$ and $L_c'$ to synch up.

all data nodes 108 update their local collection information 136 when receiving a synch-up message from management module 126. After update, data nodes 108 send acknowledgment back to management module 126. Such an acknowledgement is shown as a respective portion of "other data" 142 of CIS 106.

Collection Deletion

An application 120 uses a delete collection portion of API 124 (e.g., DeleteCollection(cid)) to delete a collection 128. Responsive to this invocation, collection-based module 118 communicates the request to management module 126, which in turn marks the collection 128 in centrally managed collection information 134 as deleted (the final state of the collection). Management module 126 broadcasts the cid and the final state to all collection locations. When a data node 108 receives the final state of the collection 128, the data node 108 stops any ongoing operation for the collection 128, rejects any future operation on the collection 128, and marks the collection 128 in local information 136 as deleted (e.g., tombstones the collection 128). The data node 108 then sends an acknowledgment to management module 126 indicated that the collection has been tombstoned. When management module 126 receives acknowledgments from all data nodes 108 listed in the collection locations, management module 126 also tombstones the collection 128. CIS 106 initiates a garbage collection of all such tombstoned collections 128.

Exemplary Collection Repair for Permanent Data Node Failures

When a data node 108 (data node x) permanently fails, or a disk scan of the data on x discovers data corruption, management module 126 decommissions x and repairs a collection c 128 a copy of which was stored on x to other data nodes 128. In this implementation, for each collection c, collection location based criteria determine repair operations. Such repair criteria include, for example, the following scenarios.

Case 1. $x \in L_c \cap L_c'$. In this scenario, when an existing collection location 108 permanently fails, management module 126 selects a new collection location y 108. In one implementation, for example, this is accomplished as follows:

1. Management module 126 selects a new location y for a collection 128; selects z in $L_c \backslash \{x\}$ to be a source 108 for collection repair (if $L_c \backslash \{X\}$ is the empty set, then all collection locations are compromised and data loss occurs).
2. Management module 126 updates centrally managed collection information 134 as follows: $L_c$ is $L_c \backslash \{x\}$; $L_c'$ is changed to $L_c' \backslash \{x\} \cup \{y\}$; execution_plan is added to the data structure (132) with (copy z to y); and instance number is incremented by one; recycle remains the same. Management module 126 syncs up the new represented state with the data nodes 108 in $L_c \cup L_c'$.
3. Management module 126 informs the source z to copy all of its objects in the collection 128 to y. Data node z copies its objects in the collection 128 to y, and it also passes the collection state and the object states (e.g., a respective portion of local information 136) to y.
4. It is possible that meanwhile new objects are checked into z. Node z can terminate the copying process as described, for example, in steps 5 and 6.
5. Once node y successfully locally stores object replicas received from z, node y sends positive acknowledgments back to z. For objects stored, y marks the object as complete if the object is marked complete on z, and marks it partial otherwise. Node y also locally stores collection local information 136.
6. Node z performs the following to terminate the copying process. After starting the copying process, z determines a cutoff time t. A convenient time is when z receives the new collection state and is asked to copy data to y. For all object replicas successfully stored on z by time t, node z has to successfully copy all of them to node y regardless of whether the replicas are in complete or partial states. For any object that is being stored on z after time t (due to new check-ins or partial object repair operations at other nodes), node z will not copy the object over to y, but it will follow the described check-in protocols for these new objects. Note that for these new objects, since the collection is in a transitional state, the new objects are stored as partial replicas and will not be marked complete. So for these new replicas, their check-ins may still return success status but their replicas are in the partial state. Node z is now in a transitional state.
7. After node z successfully copies all object replicas before the cutoff time, the copying process completes, and node z informs management module 126. At this time, management module 126 changes the centrally managed collection information 134 for the collection 128 as follows. The new collection state $L_c$ is changed to $L_c \backslash \{x\} \cup \{y\}$, $L_c'$ is unchanged (it was already changed in step 2), execution_plan is changed by removing the (copy z to y) entry, instance number is incremented by one, and recycle is unchanged. (Note that $L_c'$ may not be equal to $L_c$ here because there might be other ongoing repairs for this collection 128. However, this particular repair from z to y is complete). Management module 126 informs all data nodes in $L_c$ and $L_c'$ about the new collection state.

Case 2. $x \in L_c' \backslash L_c$. In this case, a new node 108 selected for a future collection location fails before it becomes a current collection location. Management module 126 selects a new node y replacing x. The procedure is analogous to that in Case 1.

Case 3. $x \in L_c \backslash L_c'$. In this scenario, a data node 108 that is not going to be in a future collection location has failed. This location is garbage collected and management module 126 removes x from $L_c$, increments the instance number, and syncs up with the data nodes 108. The repair source z could also fail in the middle of repair. This would leave y partially repaired. In this latter case, management module 126 checks that y is in $L_c'$ and there is a pending execution_plan (copy from z to y, but z failed). Then management module 126 selects a new repair source 108, changes the execution_plan, and resumes the repair.

Transient Data Node Failures

To allow new data object check-ins when there are transient data node 108 failures, management module 126 implements, for example, the following process. After determining a data node 108 is in a transient failure state, for every collection 128 hosted on the transiently failed node 108, management module 126 changes the collection state in centrally managed collection information 134 such that $L_c$ excludes the node, the instance number is changed, but $L_c'$ remains unchanged (and thus including the failed node). Management module 126 syncs up this new state with the data nodes 108 in $L_c \cup L_c'$. With this change, the check-in protocol is analogous to the protocol followed by "Collection Refresh". With new node 108 excluded in $L_c$ the check-in will not store the node in the failed node, and thus check-in can be successful if the number of nodes in $L_c$ is at least t, the minimum number of successfully stored replicas in a check-in operation. Since the collection 128 is now in a transitional state, newly checked-in object replicas will all be partial. If management module 126 later determines the node failure is permanent, then it will start the described process for repair in view of permanent data node failure.

Load Balancing

In this implementation, management module 126 performs load balancing by moving collection 128 replicas from a node x 108 to a new node y 108. The source x is in $L_c \cap L_c'$. The protocol is analogous to that described for data repair. $L_c$ is not changed (so node x can still be used for checkouts), and $L_c'$ is changed to $L_c' \backslash \{x\} \cup \{y\}$. The execution_plan is move from x to y. Termination criteria of the copying process and special transition state for a copying source are the same as discussed for collection repair. At the end of this load balancing process, management module 126 switches the new collection instance and syncs up with data nodes 108. In this scenario, if it is desired for the repair source x not to serve checkout operations during data movement, the repair source can be removed from $L_c$ when the data movement starts to simplify collection state transition.

Geographically Distributed Replication

Figure 2:
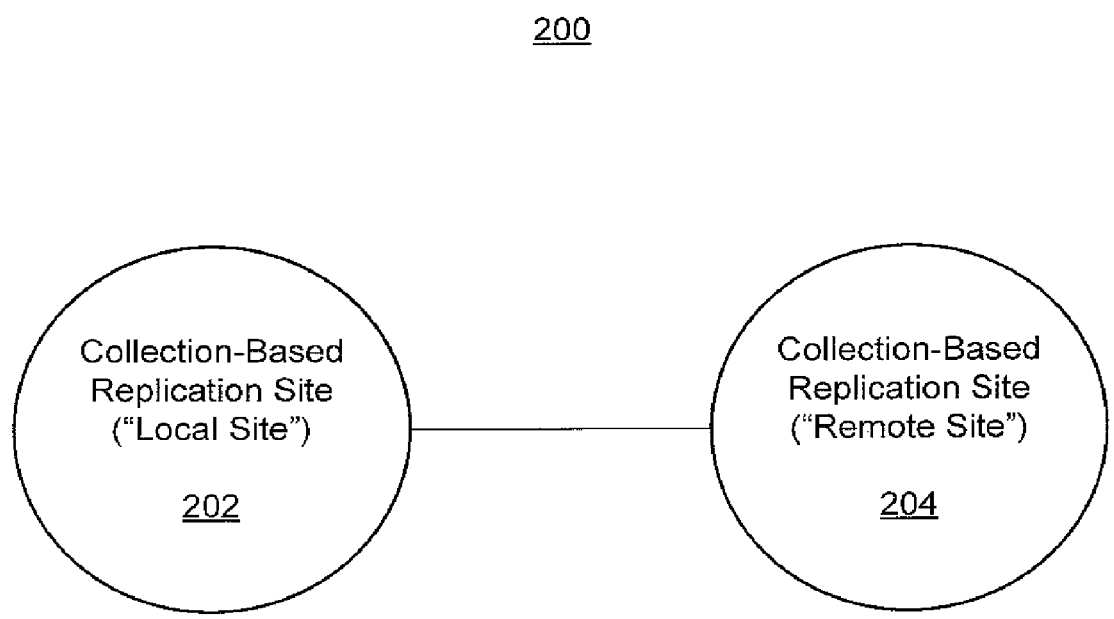
FIG. 2 shows an exemplary system for geographically distributed collection-based replication, according to one embodiment.

FIG. 2 shows an exemplary system 200 for geographically distributed collection-based replication ("geo-reptication"), according to one embodiment. In this implementation, system 200 includes two geographically distributed collection-based replication sites 202 and 204. Each geographically distributed site includes, for example, at least a subset of the components of system 100 of FIG. 1. For example, in one implementation, a geographically distributed site includes a collection information server (CIS) (e.g., analogous to CIS 106 of FIG. 1) coupled to multiple data storage nodes (e.g., analogous to data storage nodes 108 of FIG. 1). At least one geographically distributed site 202 or 204 also includes one or more client computing devices 102 coupled to the local and/or or remote site CIS and data storage nodes. Although FIG. 2 shows only two geographically separated sites for collection-based replication, system 200 could include any number of such sites.

For purposes of exemplary description, the operations of a geo-replication site 202 or 204 are described with respect to the components of FIG. 1, site 202 is referred to as a local site, and site 204 is referred to as a remote site. For example, using API 124, a client 102 in a local site 202 specifies when a collection 128 is to be geo-replicated (e.g., with the Create-Collection( ) interface) to a different site 204. For a geo-replicated collection 128, the local CIS 106 (and more particularly, management module 126) records this in collection state information associated with the collection 128. Such collection state information is shown as a respective portion of centrally managed collection information 134. Management module 126 initiates a create collection operation (e.g., CreateCollection( )) at the remote site 204. If the connection to the remote site 204 is down, in one implementation management module 126 retries until the collection 128 is created on the remote site 204, or until some other criteria is satisfied (e.g., a maximum number of tries, etc). In one implementation, at least a subset of APIs 124 include two versions, a first version for local site 202 access by a client 102, and a second version for remote site 204 access by a client 102.

When an object in a geo-replicated collection 128 is checked into one site 202, it is replicated to the remote site 204 (or vice versa). Among collection locations in the local site 202, a single data node 108 is dedicated (e.g., by lexicographic order, etc.) as responsible for geo-replication to the remote site 204. For purposes of differentiation, the single data node is referred to as a primary data node for the collection 128. In this scenario, each object replica is associated with a status indicating that the object replica has been successfully checked into the remote site 204 (e.g., a remote-complete status with respect to the remote site check-in operations). When an object is first checked into the local site 202, the local check-in protocol is the same described above in the section titled "Data Object Storage/Check-In", with the object being initially associated with a partial state, which is changed to complete after successful check-in of the object at the local site 202.

In one implementation, after an object replica is in the complete state, if the hosting node 108 is a primary node, the hosting node 108 checks the object into the remote site 204 for geo-replication (e.g., by calling the CreateCollection( ) interface on the remote site 204). After the remote check-in operations returns successfully (e.g., an acknowledgment is sent from the remote site in 204 to the local site 202), the hosting node 108 marks its local copy of the object as remote-complete and broadcasts this status change to other data nodes 108 associated with the corresponding collection 128. If the hosting node 108 of a complete object is not the primary node 108, the hosting node 108 periodically checks with the primary node 108 to see if the object has turned remote-complete. If so, the hosting node 108 turns its local copy to remote-complete.

For a remote site 204, when a new object is checked in by a different site 202, the object replicas stored locally at the remote site 204 are first in the partial state, and subsequently remote-complete state once the object is already reliably stored at the originating site 202.

Exemplary Procedures

An Exemplary Procedure for a Data Storage Node

Figure 3:
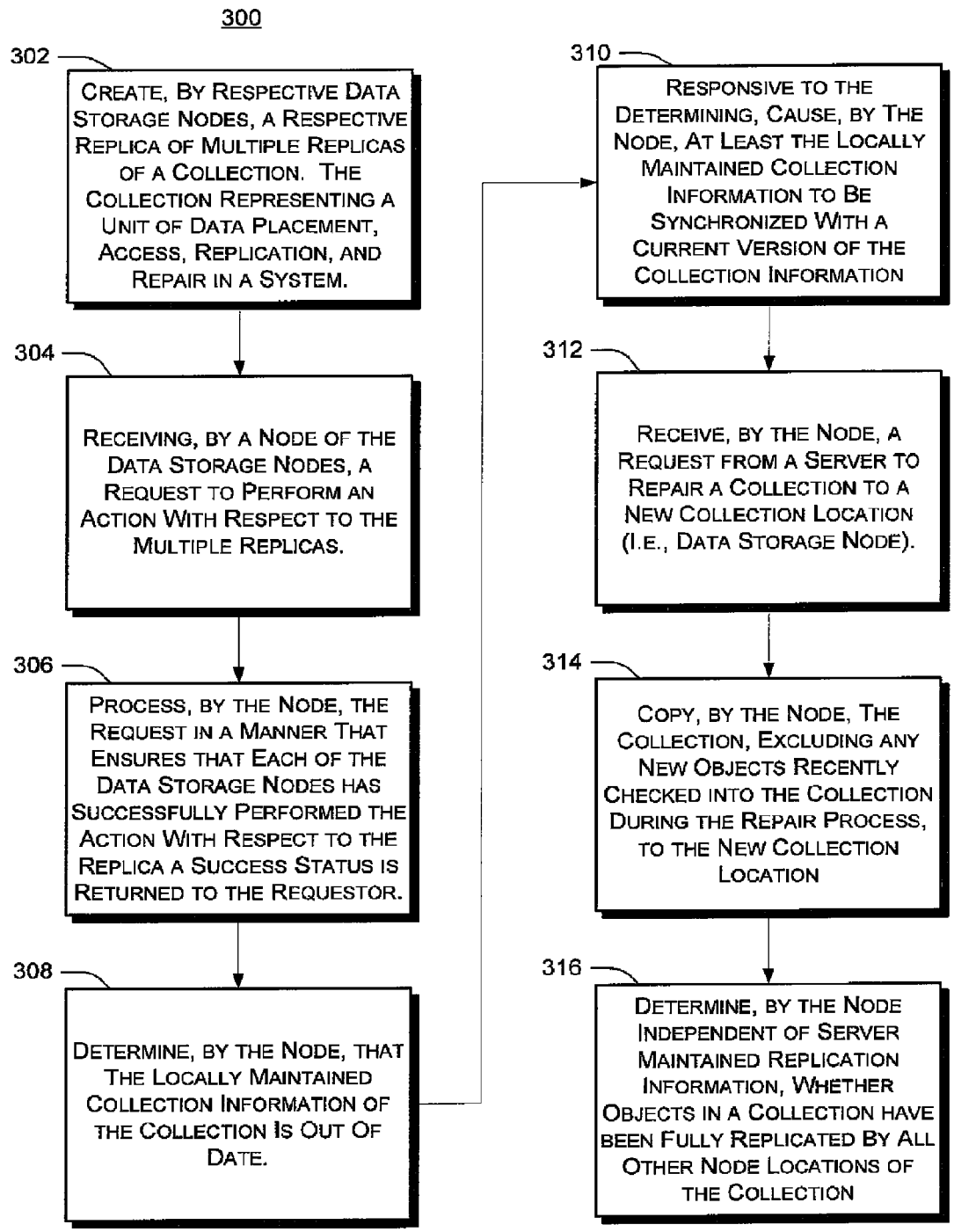
FIG. 3 shows an exemplary procedure for collection-based replication operations of a data storage node in a storage area network, according to one embodiment.

FIG. 3 shows an exemplary procedure 300 for collection-based replication operations of a data storage node 108 of FIG. 1 in a storage system 100 (FIG. 1), according to one embodiment. For purposes of discussion, the operations of FIG. 3 are described in reference to components of FIG. 1. For instance, in the description, the left-most digit of a component reference number identifies the particular Figure in which the component first appears. Additionally, although the operations of procedure 300 are illustrated with respect to a sequential ordering of operations associated with blocks 302 through 316, operations of respective ones of these blocks could be implemented in a different order. For example, in one implementation the operations of block 308 and 310 are performed before the operation of block 306, etc. In view of this, exemplary operations of procedure 300 are now described.

At block 302, data storage nodes 108 create a respective replica of multiple replicas of a collection 128. The collection 128 represents a unit of data placement, access, replication, and repair in the system 100. At block 304, a particular node of the data storage nodes 108 receives a request (e.g., directly from a client 102 or from the server 106) in the system 100. The request is to perform an action with respect to the multiple replicas of the collection 128. Such an action includes, for example, a request to check-in a data object into a replica of the collection 128, access the data object from the replica, remove the data object from the replica, and/or remove the replica from the node. At block 306, the node processes the request in a manner that ensures each of the data storage nodes associated with the collection 128 has successfully performed the action with respect to a corresponding replica of the collection 128 before any success status is returned to the client 102. The operations of block 306 may include operations by the node to facilitate partial data object repair (as described above in the section titled "partial Data Object Repair") for collection locations that have not indicated (within a configurable amount of time) that the action was successfully completed. The operations of this block also include return of an error status to the requesting client 102 if the action is not successfully performed by each of the collection locations.

At block 308, the data node 108 determines that the local information 136 of the collection 128 maintained by the data node 108 is out of date/not current. In one implementation, this determination is made in view of a locally maintained instance number of the collection and a different instance number of the collection received from a different entity (e.g., the server 106 and/or a different data storage node 108) in a request). At block 310, and responsive to determining that the collection information is out of date, the data node 108 requests synchronization (a collection refresh operation) from the server 106 to obtain a current version of the collection information 136.

At block 312, a data storage node 108 receives a request from server 106 to repair a collection 128 lost by a permanently failed data storage node 108 to a new collection location (i.e., a data storage node 108 that was not previously part of the collection locations). At block 314, and responsive to this repair request, the data storage node copies the collection 128, excluding any new objects recently checked-into the collection 128 during the repair process, to the new collection location. At block 316, and responsive to data object replication operations of any origin (e.g., a data object storage request from a client 102, a collection repair request from a server 106, etc.), the data storage node determines whether objects in a collection 128 have been fully replicated by all other locations (i.e., data storage of 108) associated with the collection 128. This is performed independently of server maintained replication information. In this implementation, server 106 does not maintain any indications of whether individual data objects associated with collections 128, or collections 128 as a whole, are fully replicated across respective ones of the data storage nodes 108 in system 100.

An Exemplary Procedure for a Client Computing Device

Figure 4:
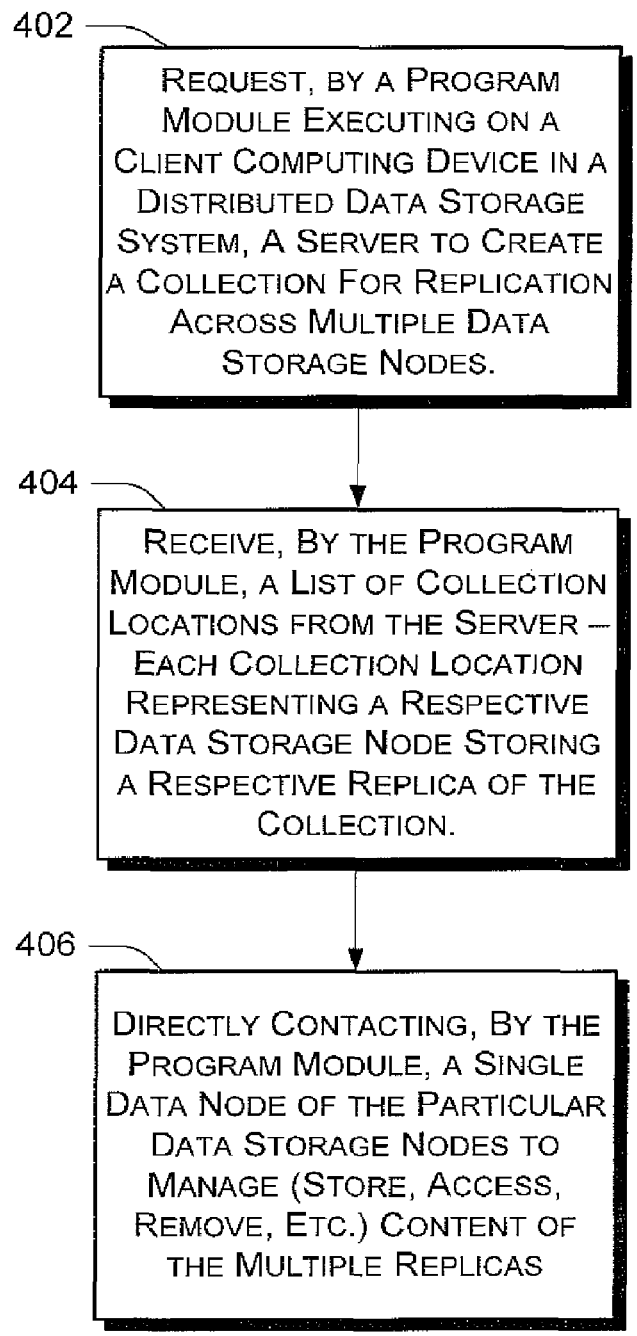
FIG. 4 shows an exemplary procedure for collection-based replication operations of a client computing device in a storage area network, according to one embodiment.

FIG. 4 shows an exemplary procedure 400 for collection-based replication operations of a client computing device 102 of FIG. 1 in a storage system 100 (FIG. 1), according to one embodiment. For purposes of discussion, the operations of FIG. 4 are described in reference to components of FIG. 1. For instance, in the description, the left-most digit of a component reference number identifies the particular Figure in which the component first appears.

At block 402, a program module (i.e., collection-based model 118) requests server 106 to create a collection 128 for replication across multiple data storage nodes 108. At block 404, and responsive to the create collection request of block 402, the program module receives a list of collection locations (an ordered array of data storage node 108 identifiers) from the server 106. Each collection location represents a respective data storage node 108 that stores a respective replica of the collection 120. At block 406, the program module directly contacts the first data storage node 108 ("first node") identified in ordered array of collection locations to request the first node to perform an action to manage content associated with the replica of the collection stored by the first node. Such an action includes, for example, a request to store the data object into the replica, retrieve the data object from the replica, remove/delete the data object from the replica, and/or remove the replica from the system 100, Responsive to successfully completing the action, the first node forwards the request to a next node in the ordered array of collection locations. This forwarding is implemented according to criteria that ensure that each node listed in the collection locations, if the node is properly operating, will have the opportunity to successfully complete the action. Thus, the client 102 directly contacts a single data storage node 108 to manage content across all replicas of the collection 128 independent of any object-to-collection mapping maintained by the server 106. In this implementation, server 106 does not maintain any such mapping. In an alternate implementation, the client 102 may contact all data storage nodes 108 in the ordered array of collection locations itself.

In one implementation, the program module of the immediately preceding paragraph performs the operations associated with blocks 402 and 406 responsive to a respective requests received (e.g., via an API 124) from a different application 120 executing on the client computing device 102.

An Exemplary Procedure for Data Repair by a Collection-Based Index Server

Figure 5:
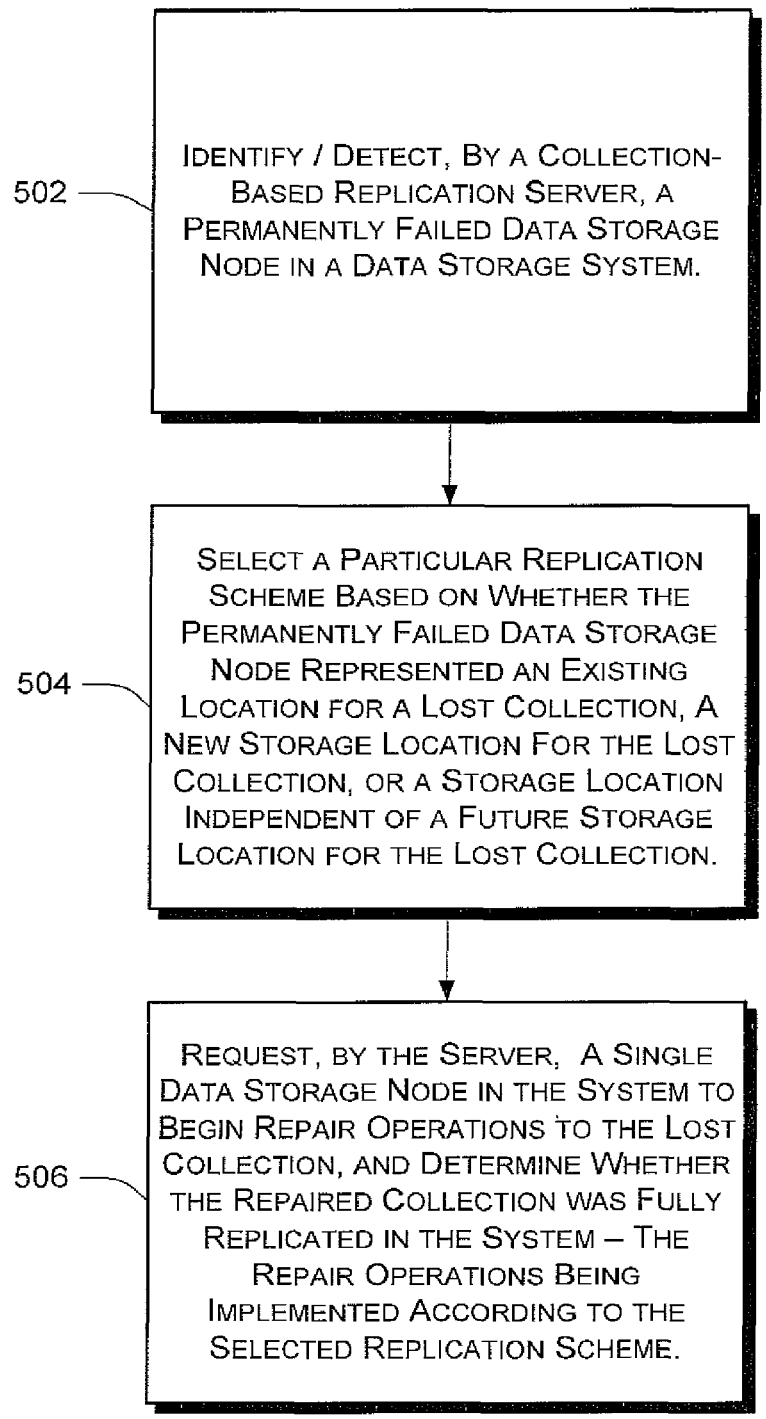
FIG. 5 shows an exemplary procedure for data repair operations by a collection-based index server in a storage area network, according to one embodiment.

FIG. 5 shows an exemplary procedure 500 for data repair operations by a collection-based index server ("server") 106 of FIG. 1 in a storage area network, according to one embodiment. For purposes of discussion, the operations of FIG. 5 are described in reference to components of FIG. 1. For instance, in the description, the left-most digit of a component reference number identifies the particular Figure in which the component first appears.

At block 502, a collection-based index server ("server") 106 (FIG. 1) identifies/detects a permanently failed data storage node 108 in a data storage system 100. At block 504, server 106 selects a particular replication scheme to repair a collection 128 that was lost on the permanently failed data storage node 108. The particular replication scheme is selected based on whether the failed node 108 represented an existing location for the lost collection 128, or a new (in progress or future) storage location for the lost collection. At block 506, the server 106 requests a single data storage node 108 that maintains an existing replica of the lost collection 128 to replicate the lost collection to a new data storage in the 108 (i.e., begin repair operations according to the select replication scheme). In this implementation, server 106 does not make any determination of whether the lost collection 128 is eventually fully replicated in the system 100. Rather, the single data storage node 108 makes that determination.

CONCLUSION

Although collection-based object replication has been described in language specific to structural features and/or methodological operations or actions, it is understood that the implementations defined in the appended claims are not necessarily limited to the specific features or actions described. Rather, the specific features and operations are disclosed as exemplary forms of implementing the claimed subject matter.

The invention claimed is:

1. A computer-implemented method for collection-based replication comprising:
    generating, by a node of a system having multiple data storage nodes, a replica of multiple replicas of a collection of data objects, each replica of the collection of data objects being stored in one of the multiple data storage nodes as a unit, accessed from the one of the multiple data storage nodes as a unit, replicated as a unit, and repaired in system as a unit, wherein one or more other nodes of the multiple data storage nodes each store a respective replica of the multiple replicas;
    determining, by the node, whether a data object that is to be added to the replica of the collection and that is received from a client of the system has been added to the replicas stored by the one or more other nodes, the determining being made by the node independently of any information on a server of the system as to whether the object has been successfully replicated in the system; and
    setting, by the node, a data object state of the data object to a partial state or a complete state based on the determining, wherein the partial state indicates that the node has not received confirmation from at least of the other nodes storing the replicas of the addition of the data object and the complete state indicates that the node has received confirmation from each of the other nodes storing the replicas of the addition of the data object.

2. The method of claim 1, wherein the system comprises multiple geographically distributed systems, and wherein the collection-based replication is geo-replicated across multiple ones of the systems.

3. The method of claim 1, wherein the determining is performed by the node responsive to receipt of a request from an application executing on the client to add the data object to the replica of the collection.

4. The method of claim 1, wherein the determining is performed by the node responsive to collection replication operations associated with permanent failure of one of the one or more other nodes.

5. The method of claim 1, wherein the replica of the collection comprises multiple data objects, the method further comprising:
    responsive to permanent failure of one of the multiple data storage nodes storing a replica of the collection, receiving by an operating node of the multiple data storage nodes a request from the server to copy the replica of the collection to a new node of the multiple data storage nodes, the new node representing a new collection location for the multiple replicas; and responsive to receipt of the request, the operating node:
copying the replica of the collection to the new node; and
communicating a state of the collection and a state of each data object of the multiple data objects to the new node.

6. The method of claim 1, further comprising:
receiving, by the node, a request to perform an action associated with the replica;
responsive to the receiving, assigning a state to another data object of the replica of the collection according to the following criteria:
indicating that the state of the other data object is a partial state when the collection is in a transitional state, or when: (a) the action has been successfully performed by the node and the node is not a last node in an ordered set of collection locations identifying the node and the one or more other nodes; and (b) at least one other node identified in the ordered set of collection locations has not acknowledged to the node that the at least one other node has successfully performed the action to a respective data object of the replica of the collection; and
indicating that the state is a complete state (c) when the collection is in a stable state, and when either: (d) the node is represented as a last node in the ordered set of collection locations and the action has been successfully performed by the node; or (e) the ordered set of collection locations represents one or more other data storage nodes subsequent to the node, and the node has received an acknowledgement that each of the one or more other data storage nodes have successfully completed the action.

7. The method of claim 1, further comprising:
receiving a request, by the node, to perform an action associated with the multiple replicas, the request comprising an ordered set of collection locations corresponding to locations where the multiple replicas are stored;
performing, by the node, the action on a first replica of the multiple replicas;
forwarding, by the node according to criteria that ensures that each node of the other nodes will have an opportunity to perform the action to a respective one of the multiple replicas, the request to a next data storage node identified in the ordered set of collection locations; and either:
responsive to determining, by the node, that each of the other nodes has successfully completed the action, communicating a success status to an originator of the request; or
responsive to determining, by the node, that at least one node of the other nodes has not indicated successful completion of the action, implementing a set of operations to try to obtain a successful completion acknowledgement corresponding to the action from the at least one node of the other nodes, and in the absence of receipt of the successful completion acknowledgement, communicating an error message to the originator.

8. The method of claim 7, wherein the originator of the request is the client, and wherein the request directs the node to store, access, or delete a data object respectively to or from the multiple replicas, or a request to remove the multiple replicas from the system.

9. The method of claim 1, further comprising:
determining a state of the collection, the state of the collection including a collection identifier, current collection locations, future collection locations, execution plans, and an instance number, the future collection locations listing k nodes, k being a desired replication degree for the collection, the state being stable when the future collection locations are equal to the current collection locations, the state being transitional when the future collection locations are different from the current collection locations,
wherein, if the state is transitional, the execution plans include steps to move data in the collection to nodes in the future collection locations; and
responsive to a change to the current collection locations or future collection locations, incrementing the instance number by one.

10. The method of claim 9, wherein the determining the state further comprises:
comparing, by the node, a locally maintained instance number associated with the replica of the collection to an instance number received in a request; and
if the local instance number is less than the instance number received in the request, determining that locally maintained collection state information is out of date.

11. The method of claim 9, further comprising:
responsive to permanent failure of one of the multiple data storage nodes storing a replica of the collection, implementing, by the server, a scheme to repair a lost collection replica based on a relationship between the failed node and the current and future collection locations;
if the failed node is represented in the current and future locations of the collection:
(a) removing the failed node from the current and future locations, and selecting a new data storage node as the future location;
(b) selecting from the current collection locations a collection replica source to copy data of the lost collection replica to the new data storage node;
(c) adding a copy action to the execution plans;
(d) incrementing the instance number; and
(e) synchronizing a new collection state to data storage nodes corresponding to the current and future locations;
if the failed node is only in the future locations of the collection, remove it from the future locations and select a new data storage node to replace it;
if the failed node has a representation in the current collection locations, removing the representation from the current collection locations; and
if the failed node is a data copy source in the execution plan, replacing a the data copy source with a different node.

12. The method of claim 9, further comprising:
determining, by the node, that a state of the collection maintained by the node is out of date;
responsive to the determining, communicating, by the node, a request to the server to synchronize collection state information;
responsive to the communicating, receiving, by the node, a current state of the collection; and
responsive to the receiving, updating, by the node, locally maintained information associated with the state of the collection to reflect the current state of the collection.

13. The method of claim 12, wherein responsive to the communicating, the method further comprises:
    receiving, by at least a subset of the other nodes, a current state of the collection; and
    updating, by the at least a subset, locally maintained information associated with the collection to reflect the current state of the collection.

14. The method of claim 1, further comprising:
    receiving, by the node, a request to perform an action associated with another data object of the replica of the collection;
    performing, by the node, the action;
    when the performing is successful and the node is not represented as a last node in an ordered set of nodes storing the multiple replicas:
        (a) setting, by the node, a state of the other data object to partial to indicate that the node does not have information indicating that the other data object has been successfully stored on all collection locations;
        (b) forwarding, by the node, the request to a next node in the ordered set of nodes;
        (c) waiting, by the node, a configurable amount of time for a success acknowledgement from the next node, the success acknowledgement indicating that the action was successfully performed by the next node and any other data storage nodes represented subsequent to the next node in the ordered set of nodes; and
        (d) responsive to expiration of the configurable amount of time, implementing, by the node, partial object repair operations to turn a data object on a particular node represented in the ordered set of nodes that is in a partial state to a complete state indicating that the other data object has been successfully stored on all collection locations; or
    when the performing is successful and the node is represented as a last node in the ordered set of nodes:
        (e) setting the state of the other data object to complete; and
        (f) communicating an acknowledgement of success to a data storage node that is represented immediately previous to the node in the ordered set of nodes.

15. The method of claim 14, further comprising:
    receiving, by a particular node of the data storage nodes, an acknowledgement associated with the action from a different node, the particular node being represented as a first node in the ordered set of nodes, the different node being represented as a second node in the ordered set of nodes;
    when the acknowledgement indicates success, communicating a success status to the client, the success status indicating that all data storage nodes represented in the ordered set of nodes successfully completed the action; and
    when the acknowledgement indicates error, communicating an error status to the client, the error status indicating that at least one data storage node represented in the ordered set of nodes failed to successfully complete the action.

16. The method of claim 14, wherein the action is an object check-in and the request comprises a collection identifier, an object identifier, data object content, and a current instance number for the collection.

17. A computer-readable medium comprising computer-program instructions that when executed by a processor perform node operations for collection-based object replication, the operations including:
    generating, by a node of a system having multiple data storage nodes, a replica of multiple replicas of a collection of data objects, each replica of the collection of data objects being stored in one of the multiple data storage nodes as a unit, accessed from the one of the multiple data storage nodes as a unit, replicated as a unit, and repaired in system as a unit, wherein one or more other nodes of the multiple data storage nodes each store a respective replica of the multiple replicas;
    determining, by the node, whether a data object that is to be added to the replica of the collection and that is received from a client of the system has been added to the replicas stored by the one or more other nodes, the determining being made by the node independently of any information on a server of the system as to whether the object has been successfully replicated in the system; and
    setting, by the node, a data object state of the data object to a partial state or a complete state based on the determining, wherein the partial state indicates that the node has not received confirmation from at least of the other nodes storing the replicas of the addition of the data object and the complete state indicates that the node has received confirmation from each of the other nodes storing the replicas of the addition of the data object.

18. The computer-readable medium of claim 17, wherein the operations further include:
    receiving a request to perform an action associated with the replica;
    responsive to the receiving, assigning a state to another data object of the replica of the collection according to the following criteria:
        indicating that the state of the other data object is a partial state when the collection is in a transitional state, or when: (a) the action has been successfully performed by the node and the node is not a last node in an ordered set of collection locations identifying the node and the one or more other nodes; and (b) at least one other node identified in the ordered set of collection locations has not acknowledged to the node that the at least one other node has successfully performed the action to a respective data object of the replica of the collection; and
        indicating that the state is a complete state (c) when the collection is in a stable state, and when either: (d) the node is represented as a last node in the ordered set of collection locations and the action has been successfully performed by the node; or (e) the ordered set of collection locations represents one or more other data storage nodes subsequent to the node, and the node has received an acknowledgement that each of the one or more other data storage nodes have successfully completed the action.

19. A computer-readable medium of claim 17, wherein the operations further include:
    determining a state of the collection, the state of the collection including a collection identifier, current collection locations, future collection locations, execution plans, and an instance number, the future collection locations listing k nodes, k being a desired replication degree for the collection, the state being stable when the future collection locations are equal to the current collection locations, the state being transitional when the future collection locations are different from the current collection locations,
    wherein, if the state is transitional, the execution plans include steps to move data in the collection to nodes in the future collection locations; and responsive to a change to the current collection locations or future collection locations, incrementing the instance number by one.

20. In a networked environment, a data storage node of a system having multiple data storage nodes, comprising:
a processor; and
a memory coupled to the processor, the memory comprising computer-program instructions that, when executed by the processor, perform operations including:
generating a replica of multiple replicas of a collection of data objects, each replica of the collection of data objects being stored in one of the multiple data storage nodes as a unit, accessed from the one of the multiple data storage nodes as a unit, replicated as a unit, and repaired in system as a unit, wherein one or more other nodes of the multiple data storage nodes each store a respective replica of the multiple replicas;
determining whether a data object that is to be added to the replica of the collection and that is received from a client of the system has been added to the replicas stored by the one or more other nodes, the determining being made by the node independently of any information on a server of the system as to whether the object has been successfully replicated in the system; and
setting a data object state of the data object to a partial state or a complete state based on the determining, wherein the partial state indicates that i) the collection is in a transitional state or ii) the node has not received confirmation from at least of the other nodes storing the replicas of the addition of the data object and the complete state indicates that the collection is in a stable state and the node has received confirmation from each of the other nodes storing the replicas of the addition of the data object.

* * * * *